(12) United States Patent
Morris et al.

(10) Patent No.: US 9,879,566 B2
(45) Date of Patent: Jan. 30, 2018

(54) TURBINE ENGINE COUPLINGS AND METHODS FOR MANUFACTURING TURBINE ENGINE COUPLINGS

(71) Applicant: HONEYWELL INTERNATIONAL INC., Morristown, NJ (US)

(72) Inventors: Mark C. Morris, Phoenix, AZ (US); David R. Waldman, Phoenix, AZ (US); Donald G. Godfrey, Phoenix, AZ (US); Brian G. Baughman, Surprise, AZ (US); Mark McNair, Gilbert, AZ (US); Justin C. Mickelsen, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 266 days.

(21) Appl. No.: 14/793,465

(22) Filed: Jul. 7, 2015

(65) Prior Publication Data

US 2017/0009604 A1    Jan. 12, 2017

(51) Int. Cl.
*F01D 25/28* (2006.01)
*F16L 27/111* (2006.01)
(Continued)

(52) U.S. Cl.
CPC ............... *F01D 25/28* (2013.01); *F02C 7/32* (2013.01); *F02K 1/80* (2013.01); *F16L 27/111* (2013.01); *F16L 47/18* (2013.01)

(58) Field of Classification Search
CPC .... F01D 25/28; F02C 7/32; F02K 1/80; F16L 47/18; F16L 27/111
See application file for complete search history.

(56) References Cited

U.S. PATENT DOCUMENTS

| 2,470,989 | A | * | 5/1949 | Keller | ................. F16L 27/1004 |
| | | | | | 285/145.5 |
| 3,492,030 | A | * | 1/1970 | Lund | ..................... F16L 27/111 |
| | | | | | 285/300 |

(Continued)

OTHER PUBLICATIONS

Extended EP Search Report for Application No. 16175152.4-1754 dated Oct. 28, 2016.

*Primary Examiner* — Dwayne J White
*Assistant Examiner* — Adam W Brown
(74) *Attorney, Agent, or Firm* — Lorenz & Kopf, LLP

(57) ABSTRACT

A coupling apparatus for use in sealingly connecting a first fluid flow path to a second fluid flow path. The coupling apparatus includes a rigid fluid flow channel having a first end and a second end, wherein the fluid flow channel is substantially rigid in an axial direction and a radial direction, a first sealing terminus that is rigidly connected to the first end and that is configured for sealing with the first fluid flow path, and a second sealing terminus that is slidingly disposed about the second end such that the second sealing terminus is configured for relative movement with respect to the second end, and wherein the second sealing terminus is further configured for sealing with the second fluid flow path. The coupling apparatus further includes a flexible coupler connected to both the first sealing terminus and the second sealing terminus and surrounding the fluid flow channel, wherein the coupler is relatively more flexible in the axial direction and the radial direction as compared to the fluid flow channel.

13 Claims, 15 Drawing Sheets

(51) Int. Cl.
*F16L 47/18* (2006.01)
*F02K 1/80* (2006.01)
*F02C 7/32* (2006.01)

(56) References Cited

U.S. PATENT DOCUMENTS

| | | | | |
|---|---|---|---|---|
| 4,106,798 | A | * | 8/1978 | Haug ............... F16L 23/04 285/226 |
| 5,653,478 | A | * | 8/1997 | McGurk ......... F01N 13/1816 285/227 |
| 2014/0283922 | A1 | | 9/2014 | Strom et al. |
| 2015/0047935 | A1 | | 2/2015 | Godfrey et al. |
| 2015/0189796 | A1 | * | 7/2015 | Shedd ................ F25B 41/00 361/699 |
| 2016/0061368 | A1 | * | 3/2016 | Carlberg ........... F16L 27/023 285/146.1 |

\* cited by examiner

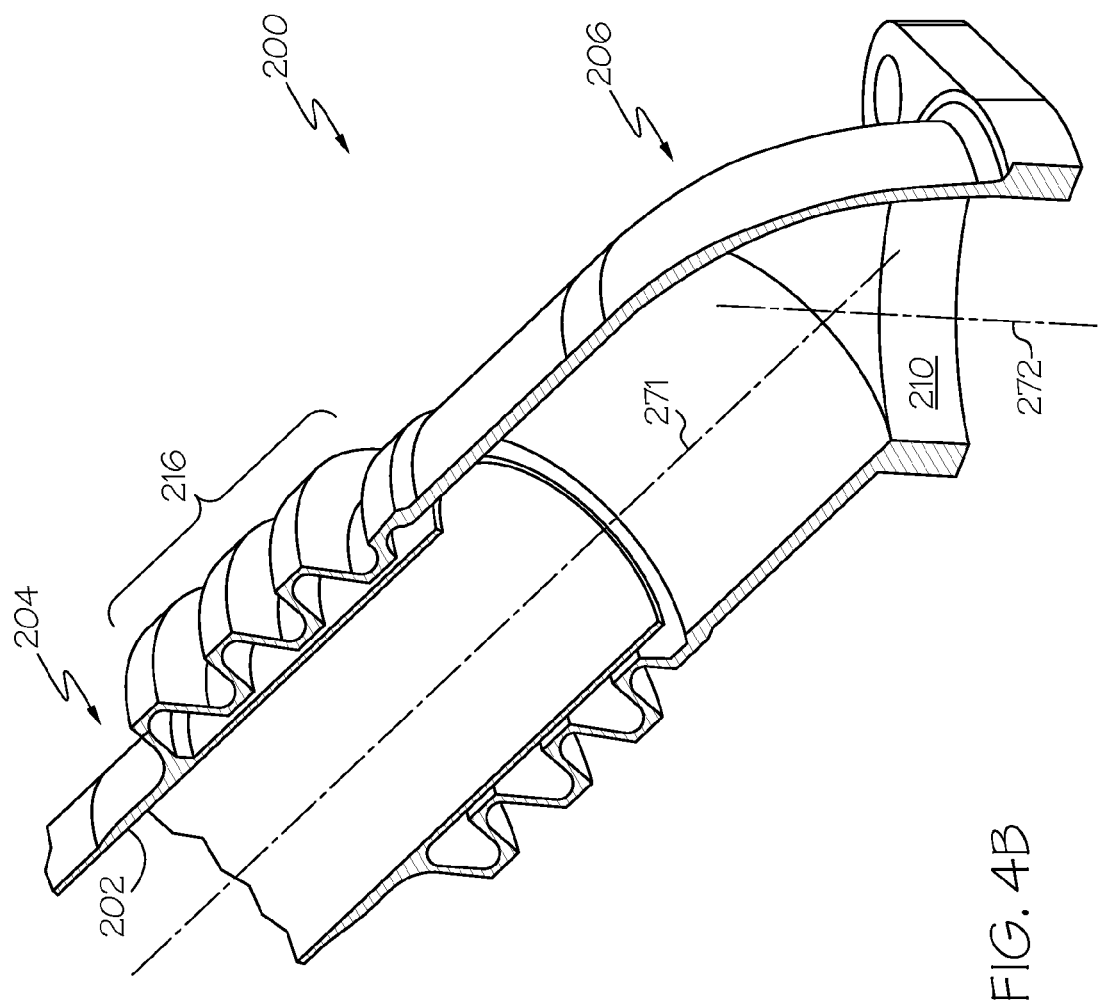

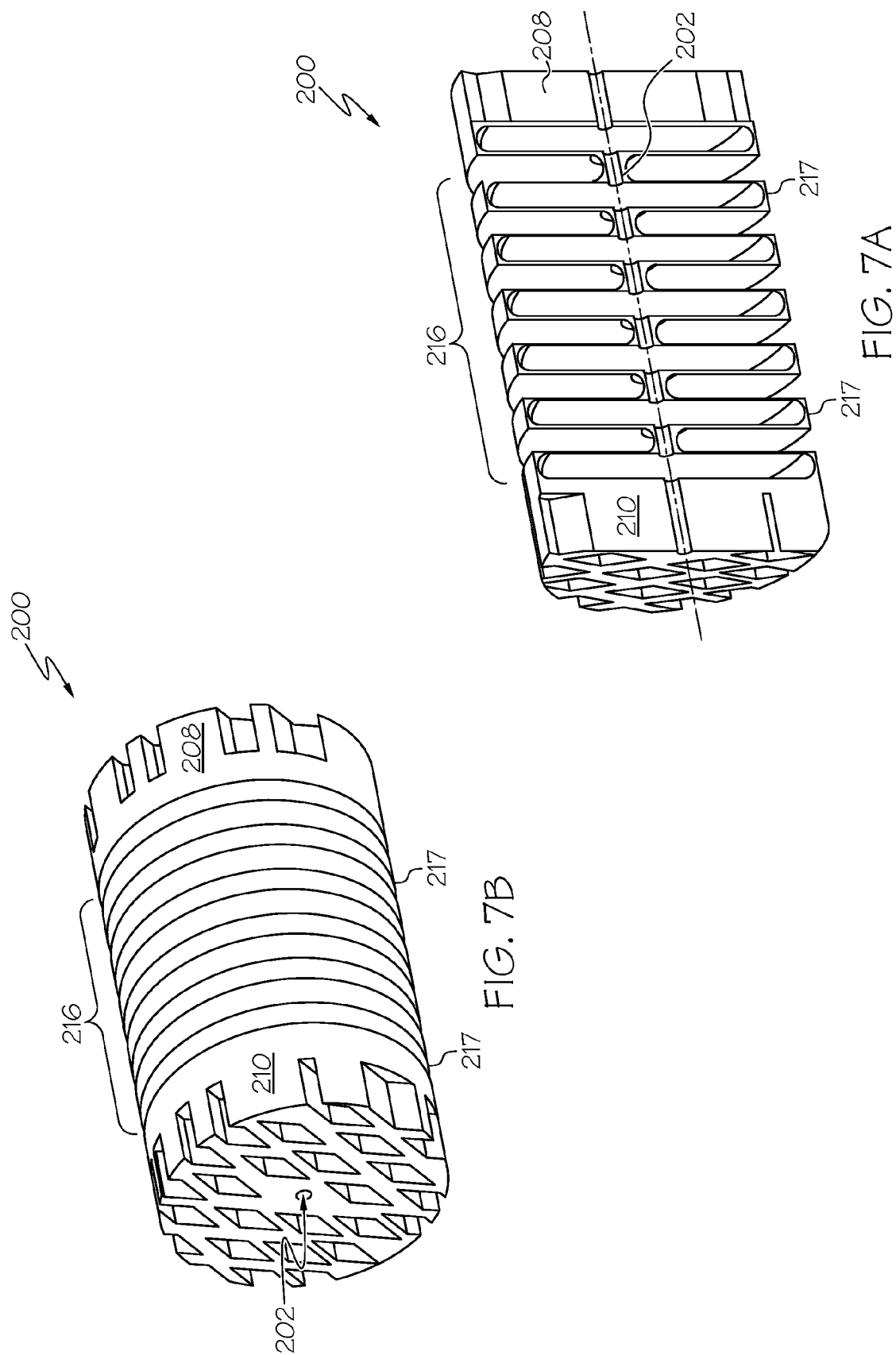

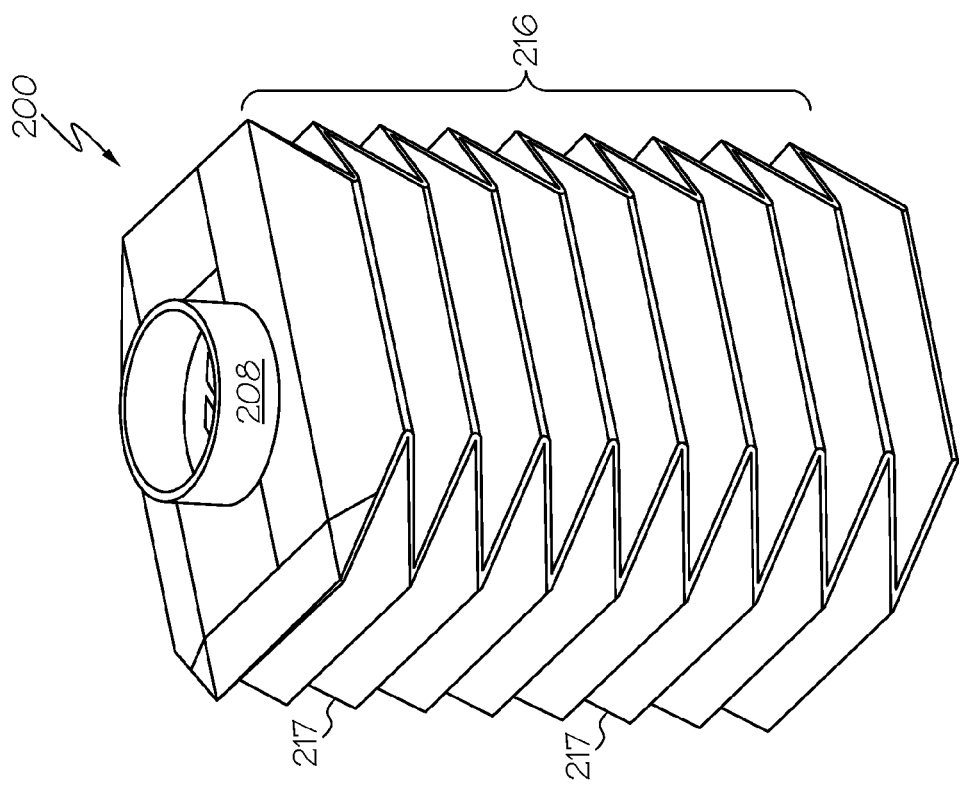
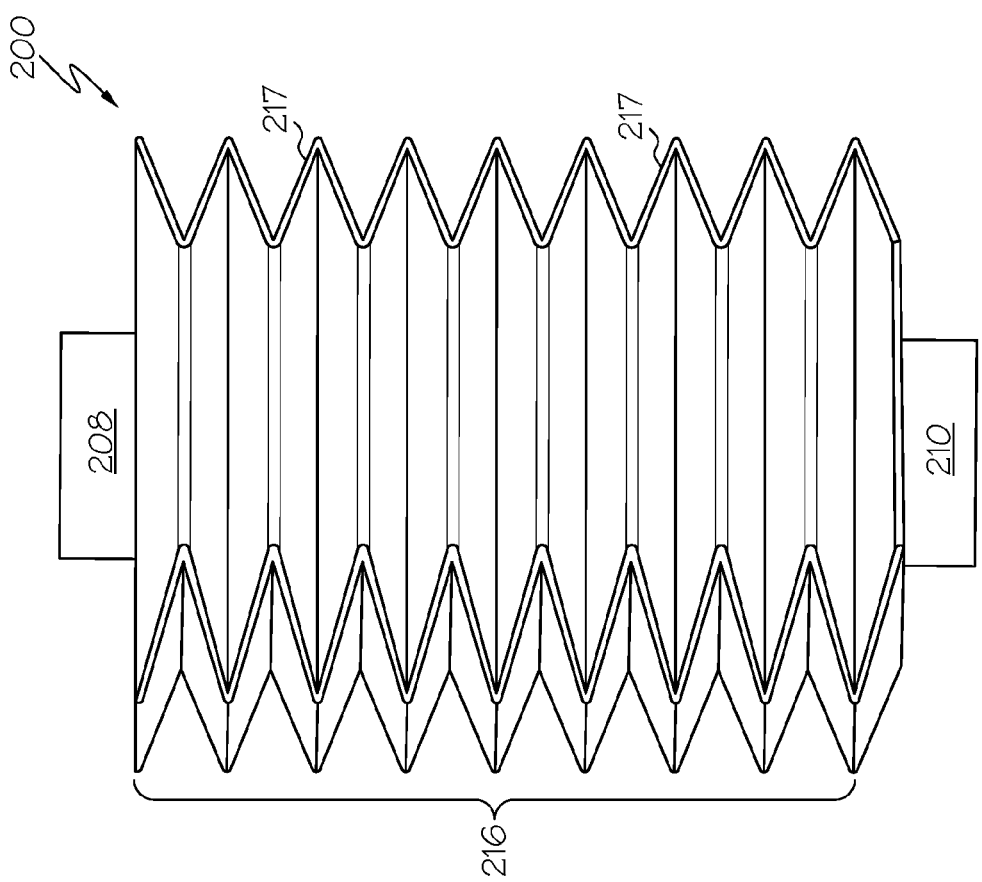

TURBINE ENGINE COUPLINGS AND METHODS FOR MANUFACTURING TURBINE ENGINE COUPLINGS

TECHNICAL FIELD

The present disclosure generally relates to turbine engines and methods used to manufacture turbine engine components. More particularly, the present disclosure relates to turbine engine couplings and methods for manufacturing turbine engine couplings.

BACKGROUND

Many industrial, aerospace, and defense applications require air to be transferred via tubes from one location in a turbine engine to another. The air must often be robustly sealed from other air or fluid sources/sinks to avoid contamination or performance loss. For example, in a turbine engine, compressor air is often bled from the main core flow and routed through air transfer tubes to buffer sump cavities or to provide critical turbine airfoil cooling or turbine disk cavity purging. Unfortunately, the routing of the air requires that the inlets and exits of the transfer tubes be capable of significant relative motion (due to thermal expansion, vibration, or mechanical loads for example), which adds complexity to the design since multiple O-ring seals, piston seals, gasket seals, and associated mating bosses are required.

In addition, the transfer tubes often employ complex multi-piece assemblies and sub-assemblies that must be welded/brazed and inspected to ensure that the assembly is capable of fully sealing the respective flows. Stresses often concentrate at the junction of the thin walled tubes and the welded/brazed thick bosses or bends, which can result in thermo-mechanical fatigue failure at the stress concentrations in the assembly at the weak weld/braze joints and interfaces. Furthermore, the operating environment may include very high pressure differentials (up to 600 psig) and a demanding high temperature (up to 1200° F.). The resulting assemblies require multiple parts and/or sub-assemblies that must be purchased or fabricated and assembled or sub-assembled prior to engine build. Improperly assembled or failed joints and interfaces may result in air leakage, which could reduce engine performance and lessen engine cooling ability.

Prior art methods for fabricating air transfer tube assemblies include utilizing drawn tubes that require subsequent forming or bending to shape, followed by braze or weld operations to secure inlet and exit bosses and sealing grooves. The welded assemblies then must undergo weld inspections and pressure testing to ensure they meet design specifications. Some attempts have been made to utilize bellows to provide compliance in the assembly, but these manufacturing processes are expensive due to the roll-forming or expansive-forming fabrication techniques and subsequent brazing/welding processes that must be employed to produce the assembly. A limitation of roll-forming or expansive-forming technologies is the geometry or shape of the metallic bellows. Using current technology, a bellows can only be circumferential if produced via roll-forming and either round or nearly round if produced via expansive forming.

Prior art methods of sealing are thus non-optimal, and an innovative, "compliant" coupling seal configuration is needed to reduce part count, cost, and complexities of these assemblies while simultaneously providing more robust sealing and life. Additive manufacturing methods are now capable of fabricating compliant coupling seals as a single part without subassemblies—an enablement that is not possible using the prior art. The compliant coupler seal can also reduce chargeable cooling flows by eliminating leakages in the assemblies of prior art configurations. Furthermore, other desirable features and characteristics of the disclosure will become apparent from the subsequent detailed description and the appended claims, taken in conjunction with the accompanying drawings and this background of the disclosure.

BRIEF SUMMARY

The present disclosure relates to turbine engine couplings and methods for manufacturing turbine engine couplings. In one exemplary embodiment, a coupling apparatus for use in sealingly connecting a first fluid flow path to a second fluid flow path includes a rigid fluid flow channel having a first end and a second end, wherein the fluid flow channel is substantially rigid in an axial direction and a radial direction, a first sealing terminus that is rigidly connected to the first end and that is configured for sealing with the first fluid flow path, and a second sealing terminus that is slidingly disposed about the second end such that the second sealing terminus is configured for relative movement with respect to the second end, and wherein the second sealing terminus is further configured for sealing with the second fluid flow path. The coupling apparatus further includes a flexible coupler connected to both the first sealing terminus and the second sealing terminus and surrounding the fluid flow channel, wherein the coupler is relatively more flexible in the axial direction and the radial direction as compared to the fluid flow channel.

In another embodiment, a method for manufacturing a coupling apparatus for use in sealingly connecting a first fluid flow path to a second fluid flow path includes the step of providing a three-dimensional design for the coupling apparatus. The three-dimensional design includes a rigid fluid flow channel having a first end and a second end, wherein the fluid flow channel is substantially rigid in an axial direction and a radial direction, a first sealing terminus that is rigidly connected to the first end and that is configured for sealing with the first fluid flow path, and a second sealing terminus that is slidingly disposed about the second end such that the second sealing terminus is configured for relative movement with respect to the second end, and wherein the second sealing terminus is further configured for sealing with the second fluid flow path. The three-dimensional design further includes a flexible coupler connected to both the first sealing terminus and the second sealing terminus and surrounding the fluid flow channel, wherein the coupler is relatively more flexible in the axial direction and the radial direction as compared to the fluid flow channel. The method further includes loading the three-dimensional design into an additive manufacturing apparatus, wherein the additive manufacturing apparatus comprises a powder bed and a focused energy beam directed at the powder bed, and manufacturing the coupling apparatus using the powder bed and the focused energy beam of the additive manufacturing apparatus in accordance with the three-dimensional design loaded in the additive manufacturing apparatus.

This summary is provided to describe select concepts in a simplified form that are further described in the Detailed Description. This summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein:

FIGS. 4A, 4B, and 4C provide views of a coupling apparatus implemented for a non-liner flow path;

FIGS. 5, 6A, 6B, 7A, and 7B illustrate various coupler convolute shapes in accordance with some embodiments of the present disclosure;

FIGS. 8A and 8B illustrate an alternative cross-sectional shape of a flexible coupler of the coupling apparatus;

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

This present disclosure utilizes Direct Metal Laser Sintering (DMLS) and other additive manufacturing (AM) processes to produce a compliant coupling apparatus as one integrated unit. DMLS is a manufacturing technology that is able to produce flexible compliant high temperature coupling apparatus from nickel-based-super-alloy materials. DMLS is a free-form approach to producing complex coupler designs that enable design engineers to innovate efficient configurations with reduced cost and part count. Unlike the prior art, this compliant coupler seal manufacturing process utilizes a low energy density laser beam by submerging the component in a fixture in a powder bed. AM processes use a small, focused beam to build a component by fusing one layer of powder to the layer of powder directly beneath it. The DMLS process is not restrained or limited by conventional roll-forming or expansive tooling which makes this a unique approach to producing compliant coupler seals. DMLS enables for the production of any shape coupling apparatus as it uses no tooling. In fact, the entire tube assembly and compliant coupling apparatus can be fabricated in a single part.

The disclosed coupling apparatus enables relative motion (both axially and radially) between a first fluid flow path and a second fluid flow path, such as a turbine shroud and a turbine nozzle assembly, while providing robust sealing between the turbine nozzle assembly cooling air and the turbine case cooling air. Such compliant coupling apparatus may also be useful for coupling at each turbine static vane to enable cooling air to be delivered through the static vane without leaking out to other cavities or to the flow path. Further compliant coupling seal opportunities in turbine engines include the transfer of turbine cooling air from the low pressure compressor, and similar embodiments can be utilized for air transfer tubes for buffering sumps or for oil or fuel nozzle assembly routing. Still further embodiments can be utilized to seal heat exchanger manifold and tube assemblies to provide thermo-mechanical fatigue compliance as well as critical sealing of pressure vessels.

Figure 1A:
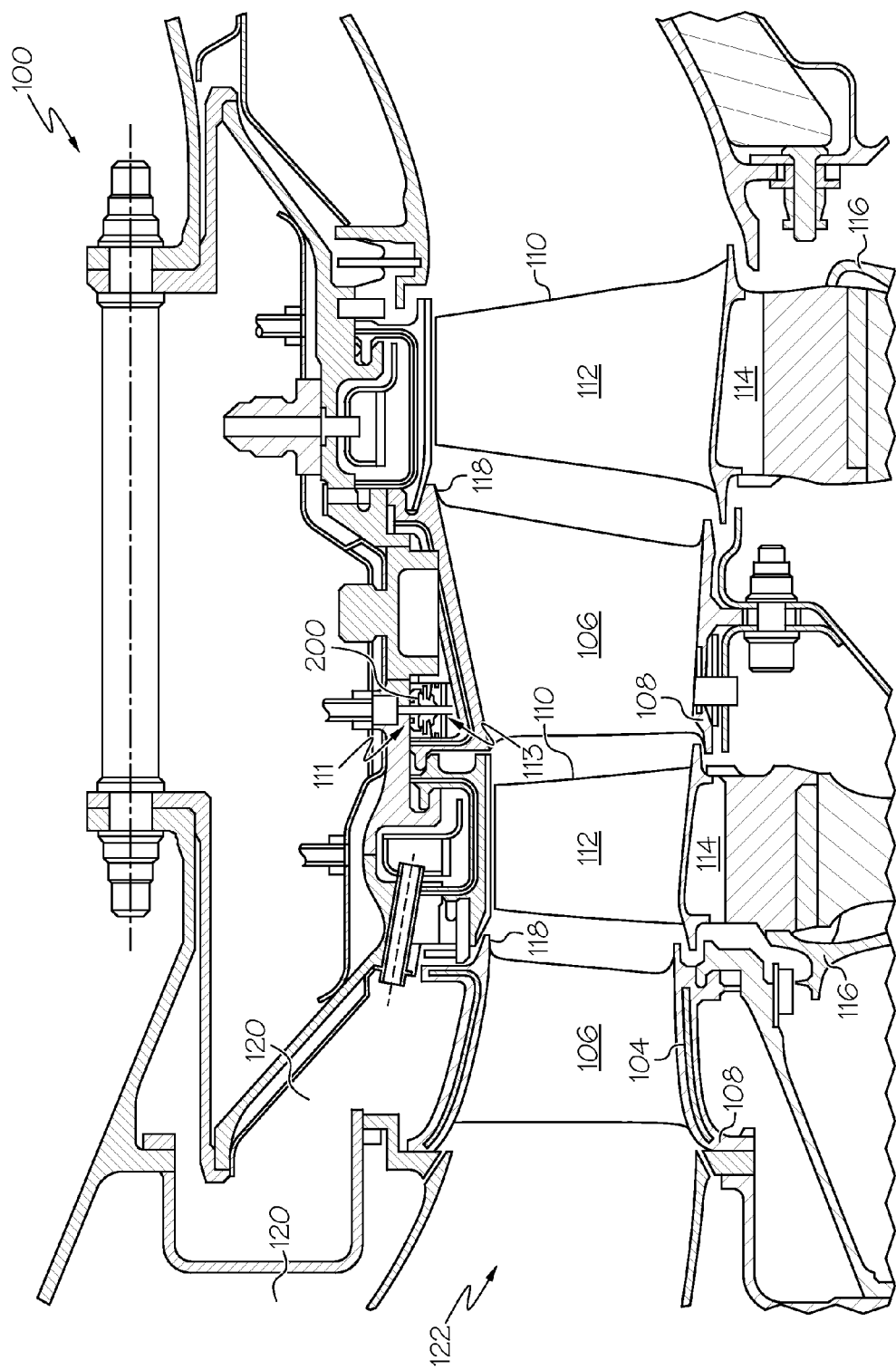
FIGS. 1A and 1B show portions of a turbine engine including a coupling apparatus in accordance with some embodiments.
Figure 1B:
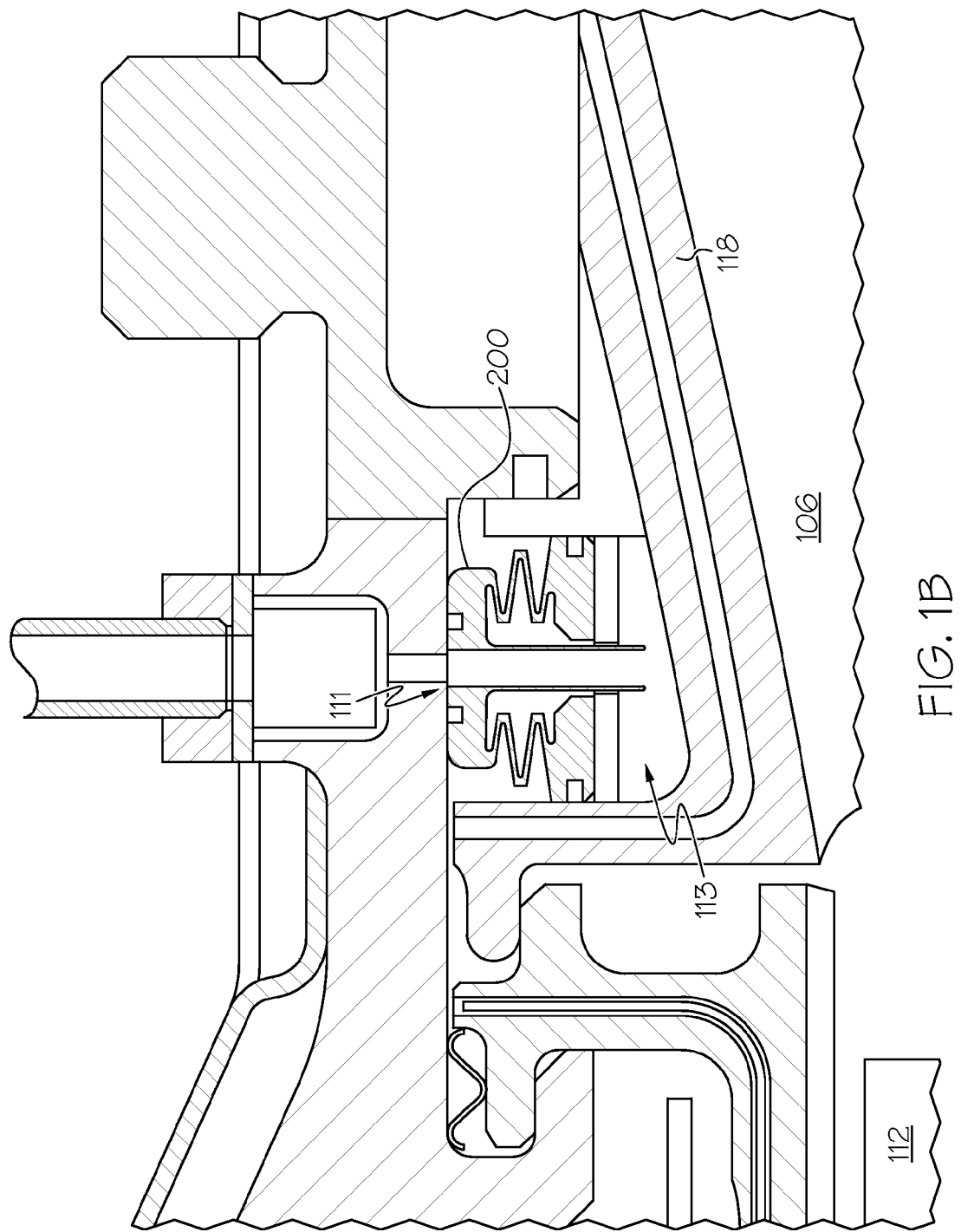

Turning now to the Figures, FIGS. 1A and 1B are cross-sectional side views of a portion of a turbine section 100 of an engine, according to an embodiment. The turbine section 100 receives high temperature (e.g., temperature greater than 1100° C.) gases from an upstream engine combustor (not shown) to produce energy for the engine and/or components coupled to the engine. In an embodiment, the turbine section 100 includes a turbine nozzle 104 that has a plurality of static vanes 106 mounted circumferentially around a ring 108. The static vanes 106 direct the gases from the combustor to a turbine rotor 110. According to an embodiment, the turbine rotor 110 includes a plurality of blades 112 that are attached to a hub 114 and retained in axial position by a retention plate 116. When the blades 112 are impinged upon by the gases, the gases cause the turbine rotor 110 to spin. According to an embodiment, an outer circumferential wall 118 surrounds the static vanes 106 and the plurality of blades 112 to define a hot air flow path 122. The circumferential wall 118 also defines a portion of a compressor plenum 120 that is disposed radially outwardly relative to the flow path 122. The compressor plenum 120 receives bleed air from a compressor section (not shown), which may be directed through one or more openings in the outer circumferential wall 118 towards the plurality of blades 112 to cool the blades 112.

A coupling apparatus 200 is also shown for use in sealingly connecting a first fluid flow path 111 to a second fluid flow path 113. In the embodiment shown in FIGS. 1A and 1B, the first fluid flow path originates from a shroud assembly of the turbine section 100 and the second fluid flow path 113 forms part of the turbine nozzle 104 assembly. Of course, in other embodiments, the first and second flow paths 111, 113 may be parts of the static vane 106 cooling air flow path, heat exchanger manifolds, or oil or fuel nozzle assemblies, as noted above.

Figure 2A:
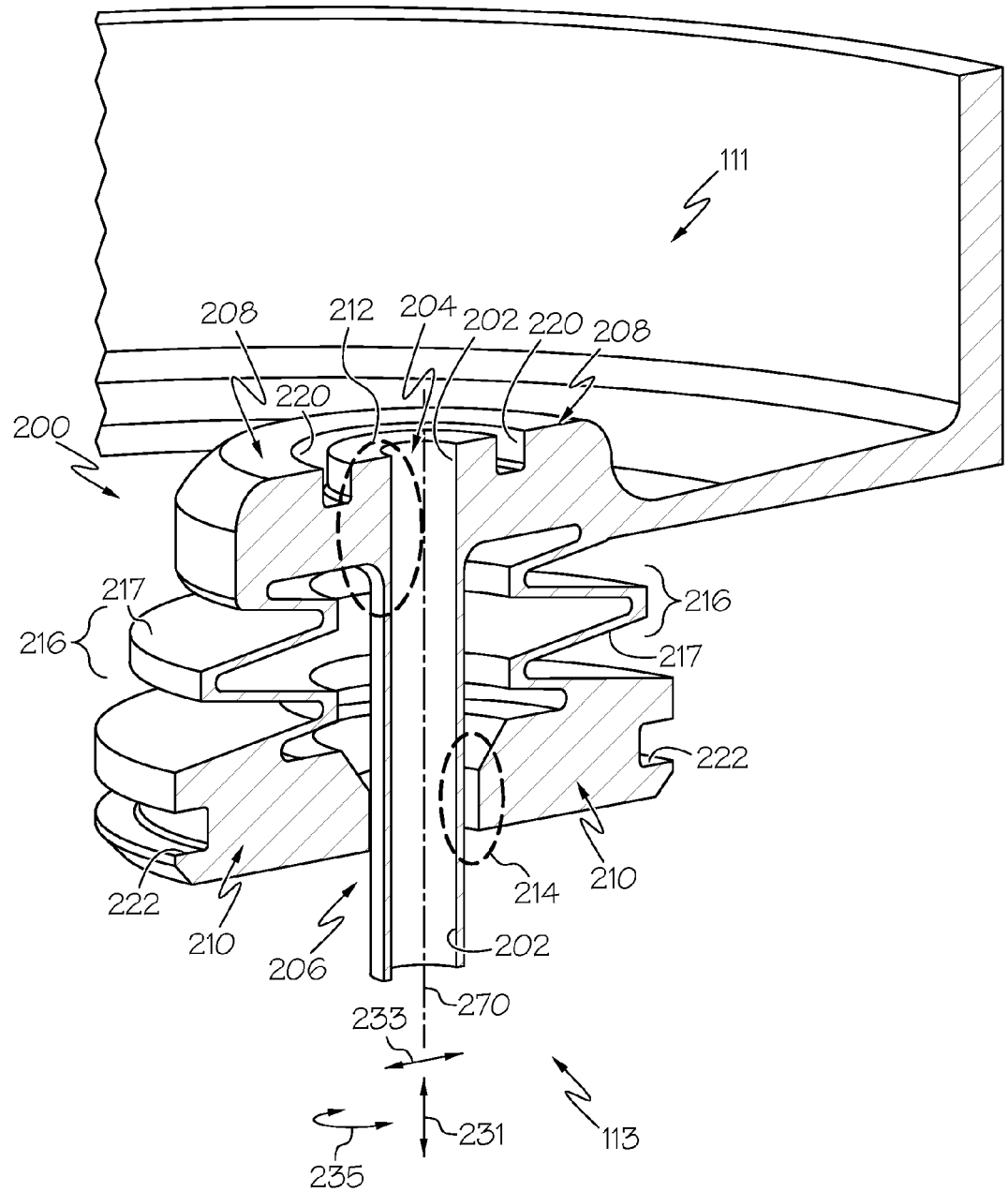
FIGS. 2A and 2B show enlarged, cross-sectional views of the coupling apparatus.
Figure 2B:
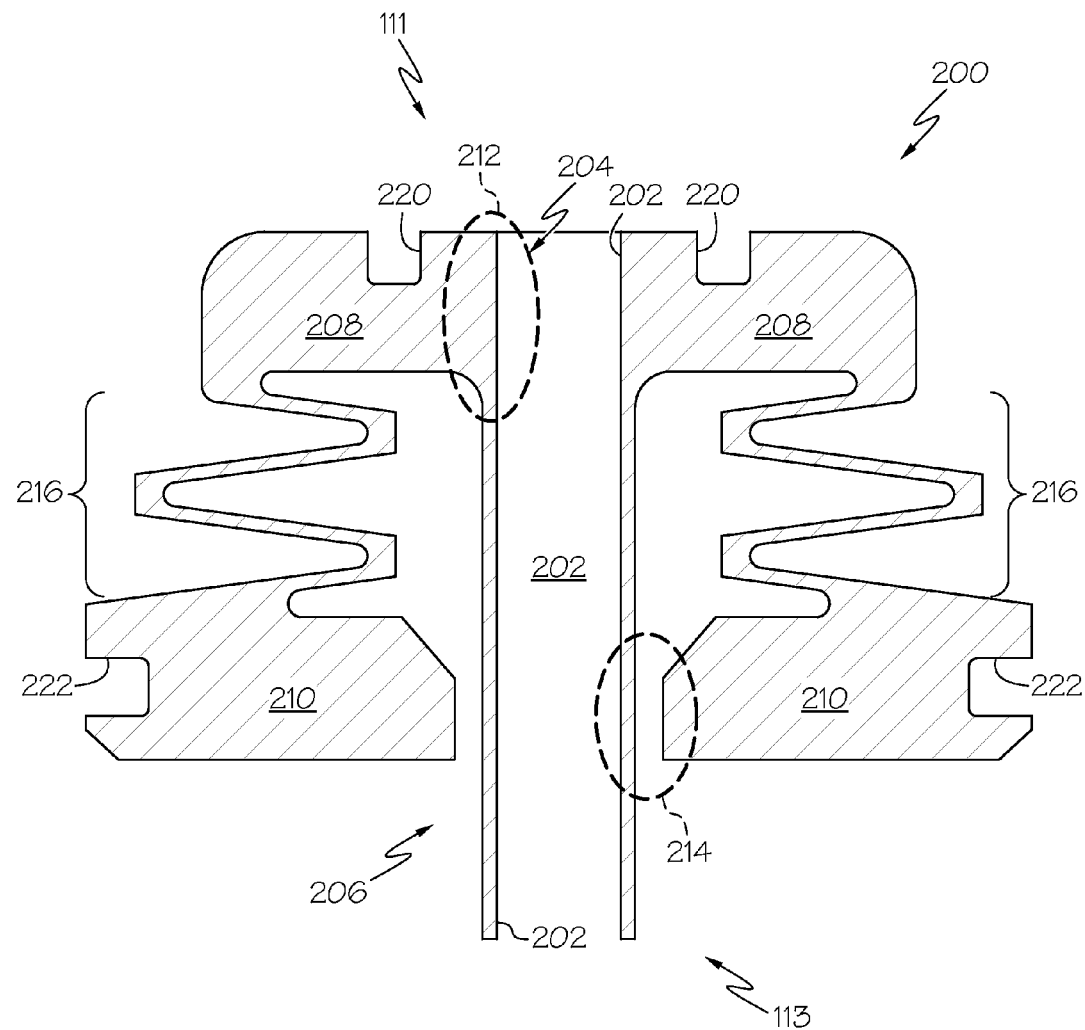

FIGS. 2A and 2B provide greater detail and illustration regarding the coupling apparatus 200. As shown, the coupling apparatus 200 includes a rigid fluid flow channel 202 having a first end 204 and a second end 206. The fluid flow channel 202 is substantially rigid in an axial direction 231, a radial direction 233, and a torsional direction 235. That is, the fluid flow channel is substantially resistant to compressing, bending, flexing, or twisting in the stated directions. The fluid flow channel 202, in the illustrated embodiment, is cylindrical in shape, having a generally circular cross-section along the axial direction 231. Other embodiments may provide for other shapes of channel 202, such as rectangular, with a square or rectangular cross-section.

As further shown, the coupling apparatus 200 includes a first sealing terminus 208 that is rigidly connected (in the circled area 212) to the first end 204 and that is configured for sealing with the first fluid flow path 111. This sealing may be accomplished with the use of a sealing member, such as an O-ring, a C-seal, a gasket, or the like, inserted into a first detent 220 outer face (either the axial facing outer face as shown, or optionally the circumferential outer face) of the first sealing terminus 208. The coupling apparatus 200 also includes a second sealing terminus 210 that is slidingly disposed (in the circled area 214) about the second end 206 such that the second sealing terminus 210 is configured for relative movement with respect to the second end 206. That is, there is no direct physical connection between the second end 206 and the second sealing terminus 210. The second sealing terminus 210 is further configured for sealing with the second fluid flow path 113. This sealing may be accomplished with the use of a sealing member, such as an O-ring, a C-seal, a gasket, or the like, inserted into a second detent 222 outer face (either the axial facing outer face, or the circumferential outer face as shown) of the second sealing terminus 210.

The coupling apparatus further includes a flexible coupler 216 connected to both the first sealing terminus 208 and the second sealing terminus 210 and surrounding the fluid flow channel 202. The coupler 216 is relatively more flexible in the axial direction and the radial direction as compared to the fluid flow channel 202. This flexibility may be provided through the use of one or more convolutes 217. The convolutes 217 provide for the described flexibility with regard to axial compression/extension and radial bending/flexing. Convolutes 217 may be angled or curved, and may generally have any shape, such as cotter-pin, "D-shaped," squared, and others. The walls of the convolutes 217 may have different thicknesses along their axial or radial lengths, may have different curves, angles, or shapes along their lengths, and may be made of different materials, in order to provide a "tuned" flexibility profile for a particular implementation.

Figure 3A:
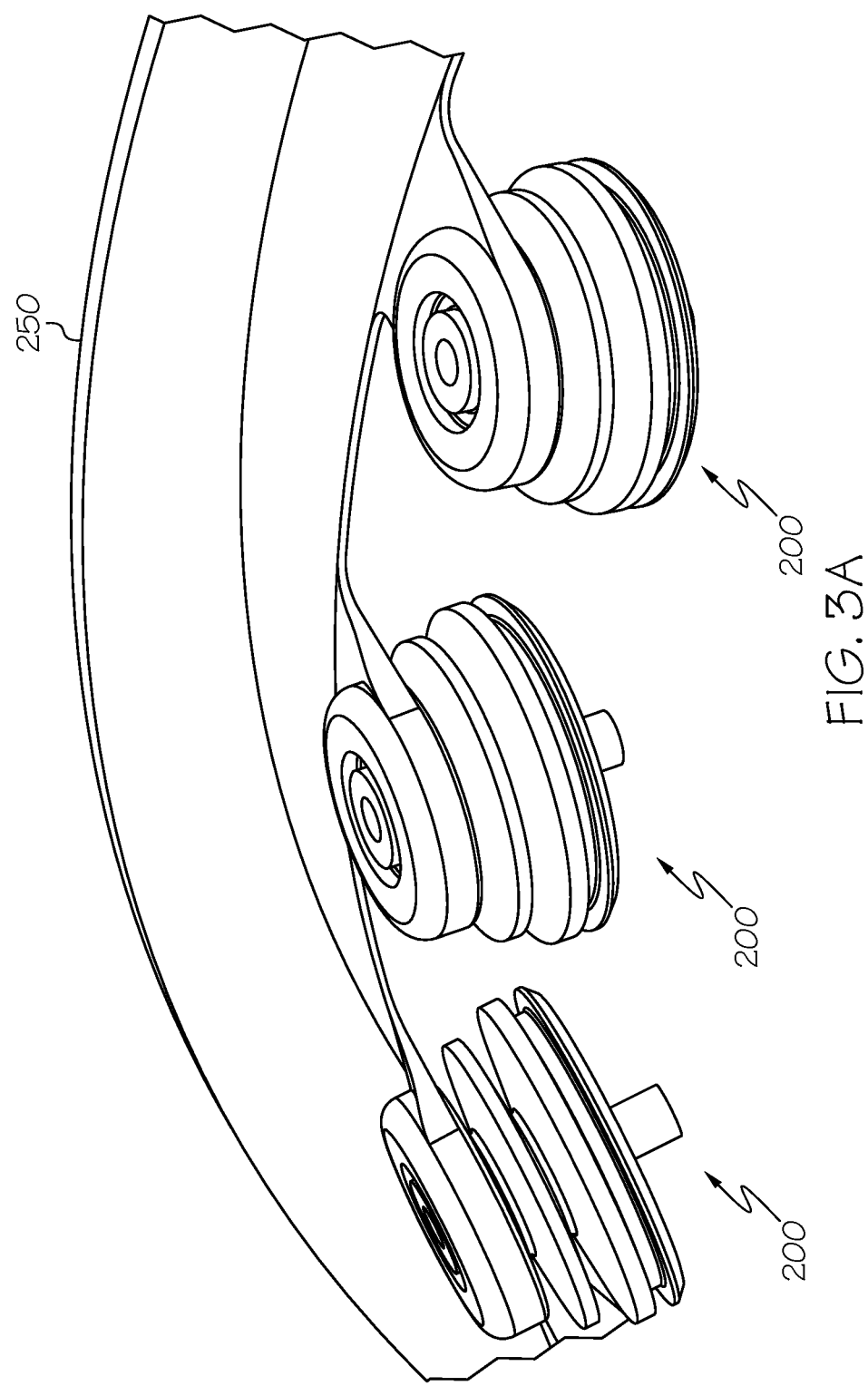
FIGS. 3A and 3B illustrate a plurality of the coupling apparatus mounted on an annular support of the turbine engine.
Figure 3B:
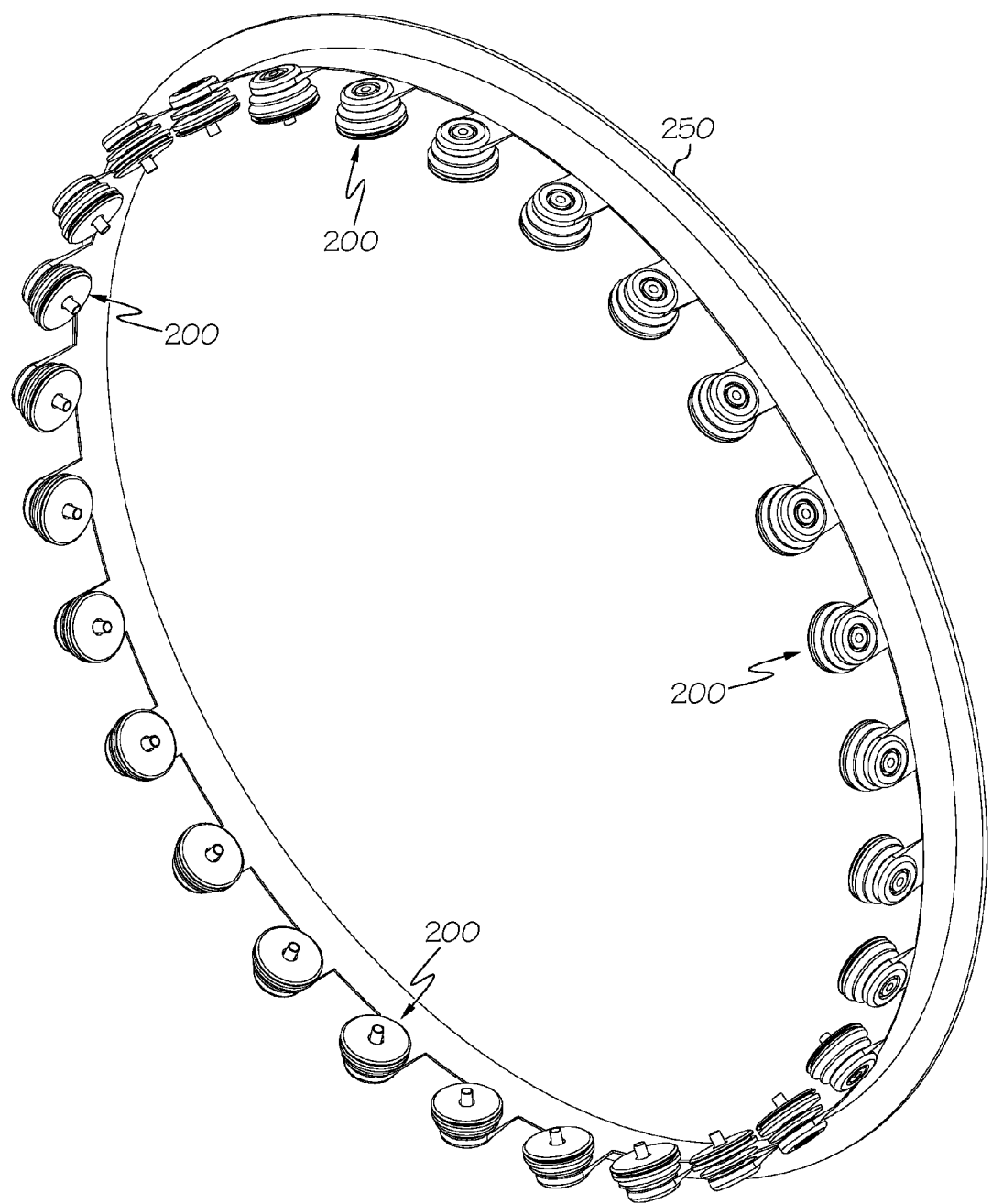

FIGS. 3A and 3B illustrate the implementation of the coupling apparatus 200 in a turbine engine. For example, there may be provided an annular support 250 for retaining the plurality of coupling apparatus 200 between the respective flow paths 111, 113. The coupling apparatus may be placed at regular intervals around the annular support 250. Generally, any number of coupling apparatus 200 may be provided on the annular support 250 for a given implementation.

Of course, the disclosure is not limited to the implementation illustrated in FIGS. 2A through 3B. For example, in an alternative embodiment, the coupling apparatus 200 may be implemented as a compliant coupler that delivers compressed air from a compressor bleed plenum across a fan bypass duct of a gas turbine engine (such as that shown in FIGS. 1A and 1B). Coupling apparatus 200 in this implementation may be used to supply high pressure air for use by an aircraft. It should be appreciated that fan bypass flows are designed to accommodate lower pressures, temperatures, and air velocities as compared to gas turbine engine core flow applications as described above. Hence, in these embodiments, the apparatus 200 architecture may be simplified. Moreover, it should also be appreciated that, as coupling apparatus 200 in this application mount between an engine and an aircraft, greater relative motion may be expected on one end as compared to the other, and as such the mount systems employed may need to be selected particularly for this purpose. In further alternative embodiments, coupling apparatus 200 may be implemented as a fire-resistant and/or oxidation resistance compliant coupler for high temperature applications (for example up to about 2000° F.) that are not economically enabled in the prior art.

Figure 4A:
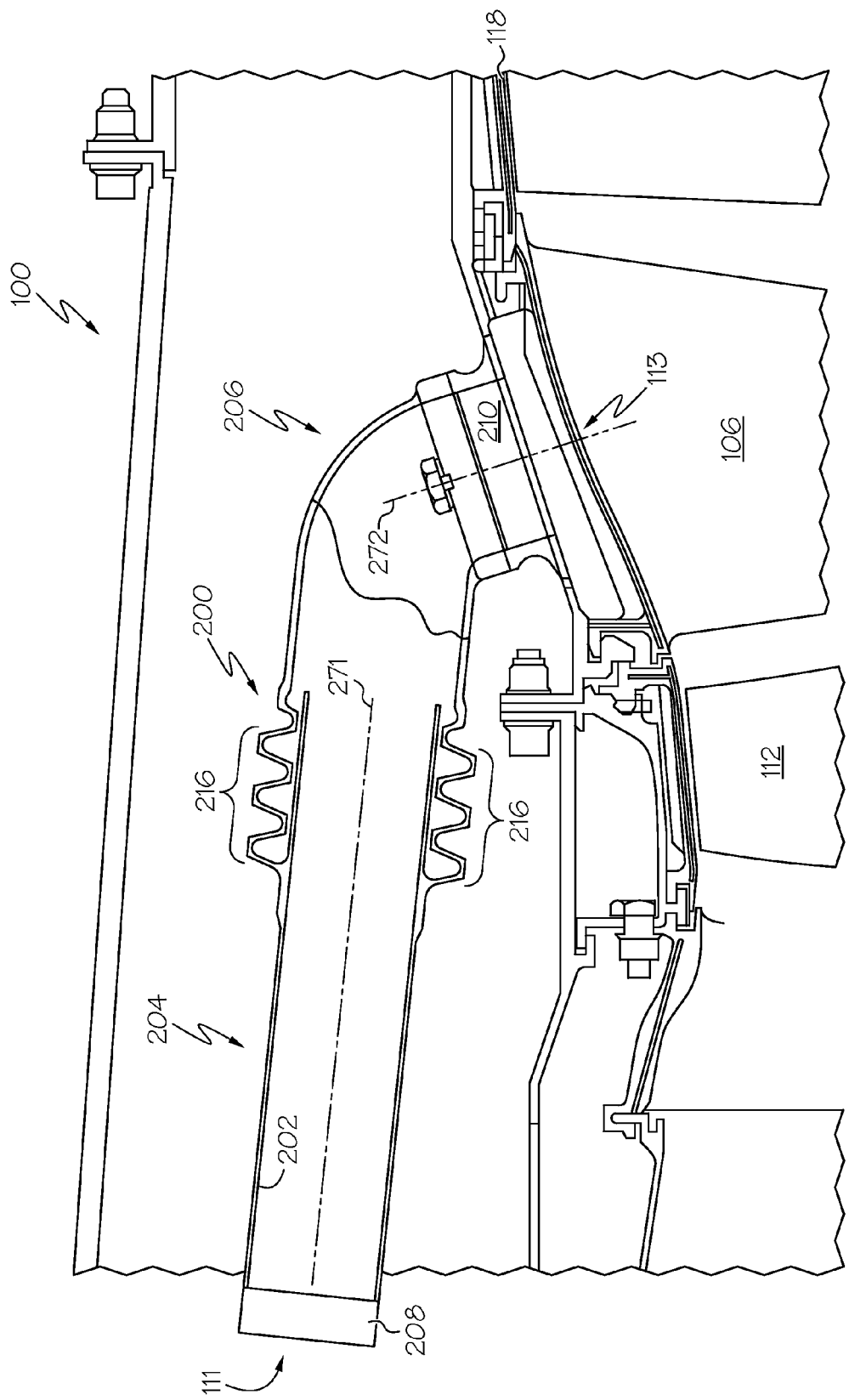
Figure 4C:
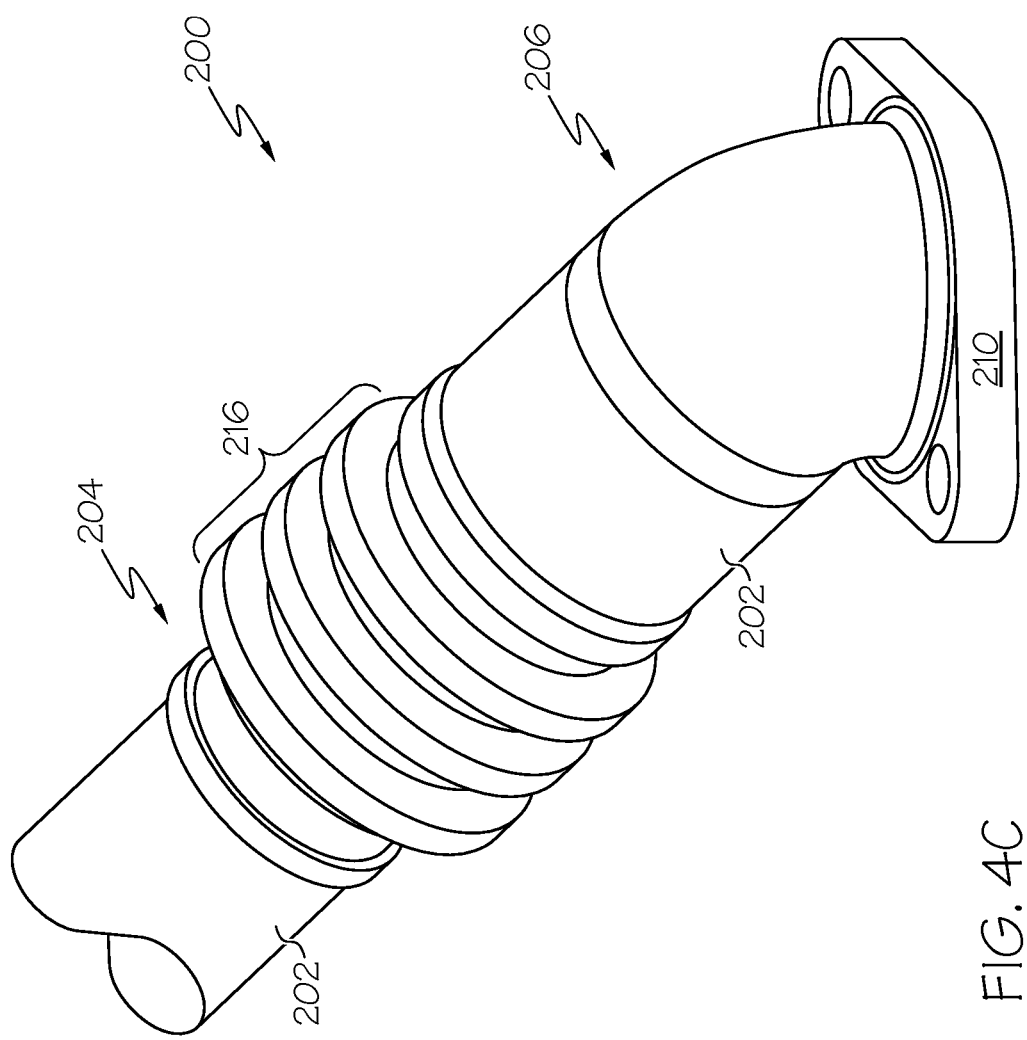
Figure 5:
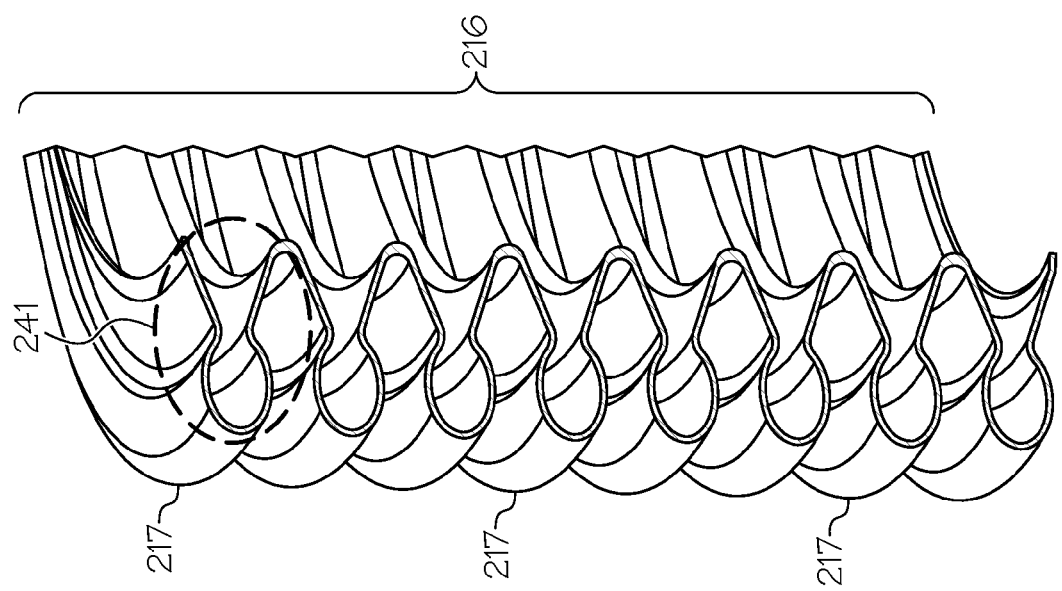

As shown in FIG. 2A, the first sealing terminus 208 and the second sealing terminus 210 are angled with respect to one another for substantially linear fluid flow (angle line 270) between the first fluid flow path 111 and the second fluid flow path 113. However, in other embodiments, such as those shown in FIGS. 4A, 4B, and 4C, the first sealing terminus 208 and the second sealing terminus 210 are angled with respect to one another for substantially non-linear fluid flow (compare angle line 271 at the first end 204 and angle line 272 at the second end 206) between the first fluid flow path 111 and the second fluid flow path 113. These non-linear embodiments may be useful for directing cooling air into static vanes 106 of the turbine engine 100, as shown particularly in FIG. 4A, among other uses.

Figure 6A:
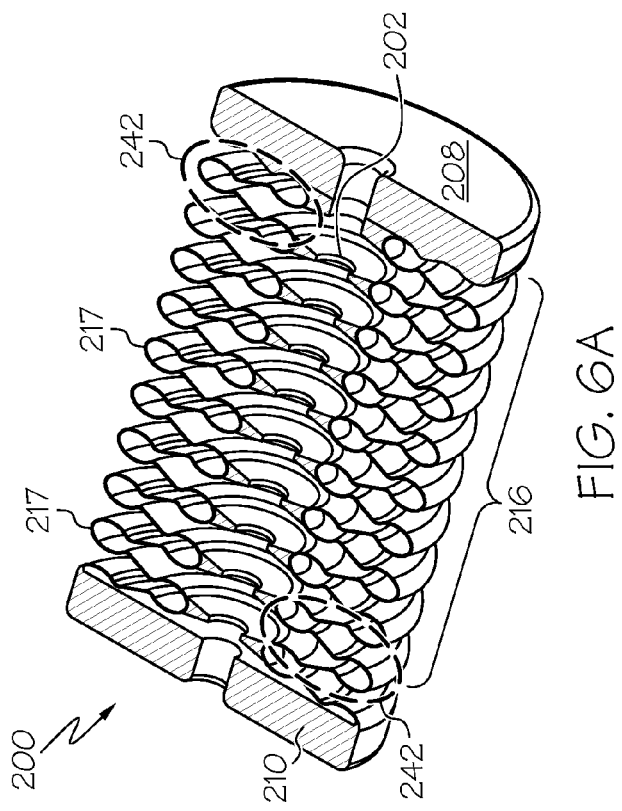
Figure 6B:
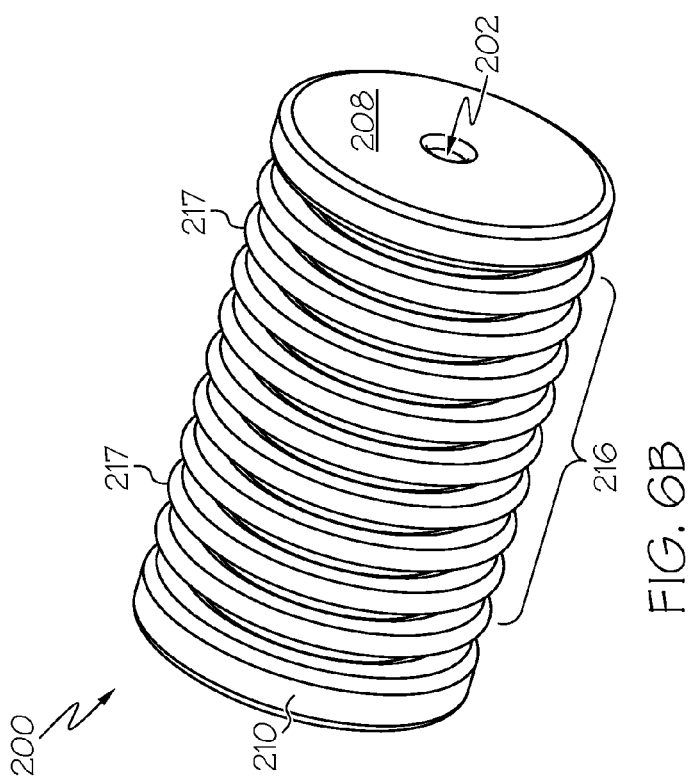

As initially mentioned above, the flexible coupler 216 may have convolutes 217 in a variety of shapes, such as rounded, squared, etc. A further embodiment of the convolutes 217 is "cotter-pin" shaped, as illustrated by circled area 241 in FIG. 5. As an extension of this embodiment, as shown in FIGS. 6A and 6B, the convolutes 217 may be "double cotter-pin" shaped, as illustrated by circled areas 242. A differently-shaped embodiment is shown in FIGS. 7A and 7B. In this embodiment, the convolutes 217 of the flexible coupler 216 are substantially "D-shaped," as illustrated. Still further, in another embodiment shown in FIGS. 8A and 8B, a square or rectangular flexible coupler 216 (with respect to its axial cross-section) is shown, as compared to the previously-illustrated embodiments, all of which had a generally circular cross-section. FIGS. 5-8B thus serve to illustrate the numerous shapes and configurations of the flexible couplers 216 and their convolutes 217 that may be provided in accordance with embodiments of the present disclosure, and enabled by the use of DMLS as will be described in greater detail below.

Figure 8C:
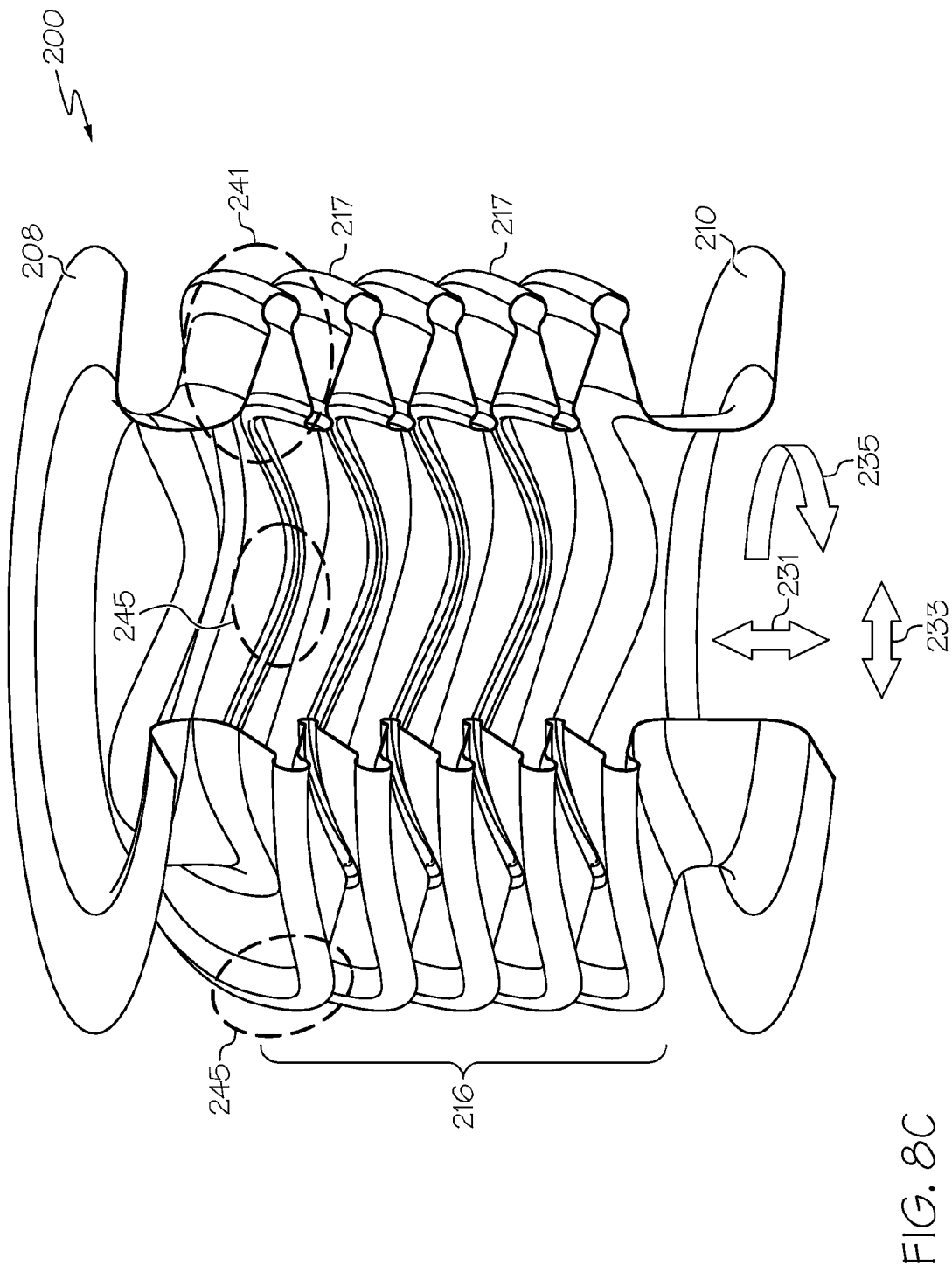
FIG. 8C illustrates an embodiment of a coupling apparatus that also provides torsional compliance.

The previously-described embodiments have demonstrated both axial and radial flexibility of the flexible coupler 216. However, in other embodiments, the flexible coupler 216 may also be made to be flexible in the torsional direction, such that it has a relatively greater flexibility in the torsional direction than the substantially rigid channel 202. FIG. 8C shows an exemplary embodiment of a flexible coupler 216 demonstrating torsional flexibility. As shown, it has a plurality of convolutes 217 that run in the axial direction 231 similar to the other embodiments (in this example, in the cotter-pin shape 241), but it also includes convolutes (circled areas 245) about the circumference of each axial convolute 217. Thus, the coupler 216 is able to be flexible with regard to any twisting forces that may be applied to it. Other embodiments of torsional flexibility are also possible, such as helical-shaped convolutes 217 having a defined helical pitch.

As initially noted, the DMLS process is not restrained or limited by conventional roll-forming or expansive tooling which makes this a unique approach to producing compliant coupler seals. DMLS enables for the production of any shape coupling apparatus as it uses no tooling. In fact, the entire tube assembly and compliant coupling apparatus can be fabricated in a single part. In general, it is expected that, based on the teachings herein, a person having ordinary skill in the art will be able to modify the coupling apparatus as above to conform for use in a wide variety of applications, as the selection of size, shape, etc. of working components is generally considered to be within the level of skill of a person having ordinary skill in the art. As such, the various possible implementations of the coupling apparatus should not be considered limited to any of the embodiments presented herein.

Greater detail regarding the additive manufacturing techniques noted above will now be provided, again with reference to the exemplary coupling apparatus shown in FIGS. 1-8C. It will be appreciated that certain features of the presently described coupling apparatus would be prohibitively expensive to manufacture using conventional manufacturing techniques. These include particularly the flexible coupler designs shown and described above. As such, designs in accordance with the present disclosure are not known in the prior art. However, it has been discovered that using additive manufacturing techniques, or other recently developed manufacturing techniques, designs in accordance with the present disclosure can be manufactured at a significantly reduced cost as compared to traditional manufacturing techniques. Additive manufacturing techniques include, for example, direct metal laser sintering (DMLS—a form of direct metal laser fusion (DMLF)) with nickel base super-alloys, low density titanium, and aluminum alloys. DMLS is discussed in greater detail below. Another technique includes electron beam melting (EBM) with titanium, titanium aluminide, and nickel base super-alloy materials.

Figure 9:
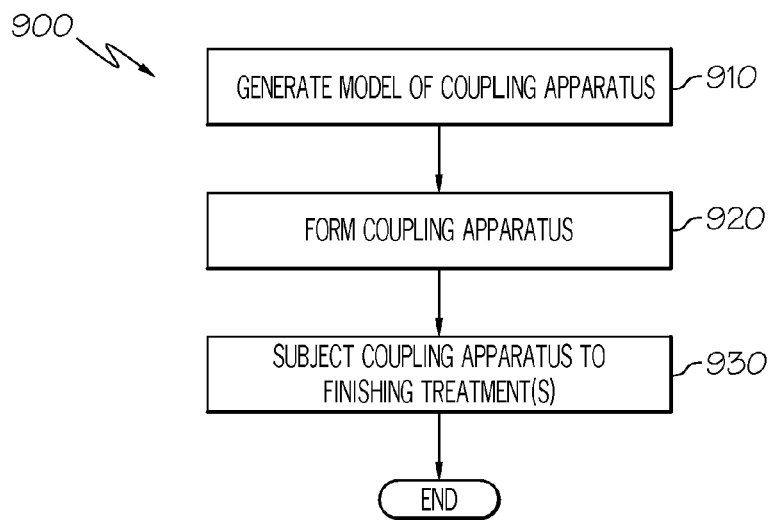
FIG. 9 is a flow diagram illustrating steps in a method of manufacturing a coupling apparatus in accordance with an embodiment of the present disclosure.

FIG. 9 is a flowchart illustrating a method 900 for manufacturing a coupling apparatus in accordance with an exemplary embodiment using, in whole or in part, additive manufacturing techniques. In the discussion that follows, "the coupling apparatus" will be referred to generically as representative of any or all portions of the coupling apparatus 200 shown above in accordance with the present disclosure, including but not limited to the configurations shown in FIGS. 1-8C, for example, that can be made using additive manufacturing techniques.

In a first step 910, a model, such as a design model, of the coupling apparatus, or component thereof, may be defined in any suitable manner. For example, the model may be designed with computer aided design (CAD) software and may include three-dimensional ("3D") numeric coordinates of the entire configuration of the coupling apparatus including both external and internal surfaces. In one exemplary embodiment, the model may include a number of successive two-dimensional ("2D") cross-sectional slices that together form the 3D component. The resulting configuration is enabled without the prior art requirements of brazing/welding.

In step 920 of the method 900, the coupling apparatus, or component thereof, is formed according to the model of step 910. In one exemplary embodiment, a portion of the coupling apparatus is formed using a rapid prototyping or additive layer manufacturing process. In other embodiments, the entire coupling apparatus is formed using a rapid prototyping or additive layer manufacturing process. Although additive layer manufacturing processes are described in greater detail below, in still other alternative embodiments, portions of the coupling apparatus may be forged or cast in step 920, for example, with a single-crystal structure.

Some examples of additive layer manufacturing processes include: selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. In one particular exemplary embodiment, direct metal laser fusion (DMLF) is used to produce the coupling apparatus in step 920. DMLF is a commercially available laser-based rapid prototyping and tooling process by which complex parts may be directly produced by precision melting and solidification of metal powder into successive layers of larger structures, each layer corresponding to a cross-sectional layer of the 3D component. DMLF may include direct metal laser sintering (DMLS), as previously noted above, and is a particularly preferred embodiment of this disclosure.

As such, in one exemplary embodiment, step 920 is performed with DMLF techniques to form the coupling apparatus. However, prior to a discussion of the subsequent method steps, reference is made to FIG. 10, which is a schematic view of a DMLF system 1000 for manufacturing the coupling apparatus, for example one or more components of the coupling apparatus as shown in FIGS. 1-8C, in accordance with an exemplary embodiment.

Figure 10:
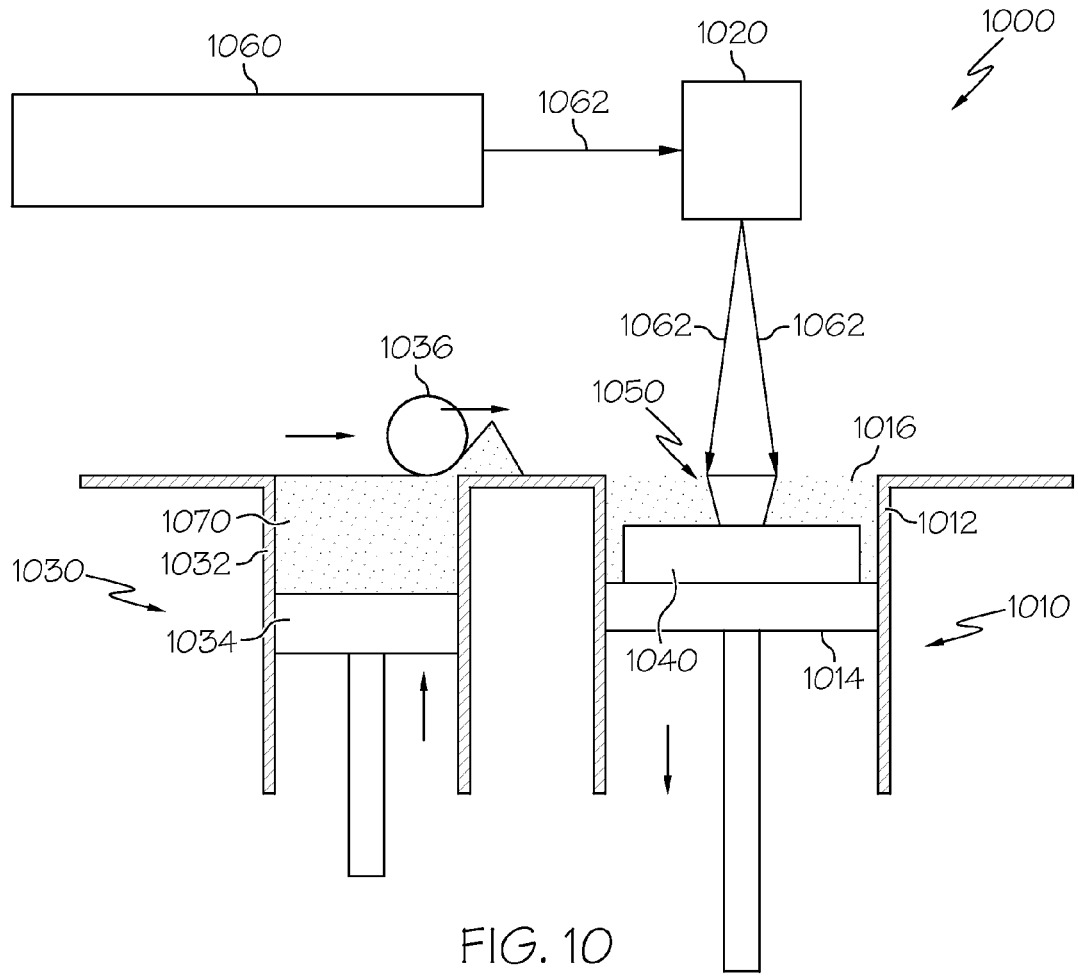
FIG. 10 is an exemplary additive manufacturing system suitable for use in manufacturing coupling apparatus in accordance with an embodiment of the present disclosure.

Referring to FIG. 10, the system 1000 includes a fabrication device 1010, a powder delivery device 1030, a scanner 1020, and a laser 1060 that function to manufacture the article 1050 (e.g., the coupling apparatus, or a component thereof) with build material 1070. The fabrication device 1010 includes a build container 1012 with a fabrication support 1014 on which the article 1050 is formed and supported. The fabrication support 1014 is movable within the build container 1012 in a vertical direction and is adjusted in such a way to define a working plane 1016. The delivery device 1030 includes a powder chamber 1032 with a delivery support 1034 that supports the build material 1070 and is also movable in the vertical direction. The delivery device 1030 further includes a roller or wiper 1036 that transfers build material 1070 from the delivery device 1030 to the fabrication device 1010.

During operation, a base block 1040 may be installed on the fabrication support 1014. The fabrication support 1014 is lowered and the delivery support 1034 is raised. The roller or wiper 1036 scrapes or otherwise pushes a portion of the build material 1070 from the delivery device 1030 to form the working plane 1016 in the fabrication device 1010. The laser 1060 emits a laser beam 1062, which is directed by the scanner 1020 onto the build material 1070 in the working plane 1016 to selectively fuse the build material 1070 into a cross-sectional layer of the article 1050 according to the design. More specifically, the speed, position, and other operating parameters of the laser beam 1062 are controlled to selectively fuse the powder of the build material 1070 into larger structures by rapidly melting the powder particles that may melt or diffuse into the solid structure below, and subsequently, cool and re-solidify. As such, based on the control of the laser beam 1062, each layer of build material 1070 may include unfused and fused build material 1070 that respectively corresponds to the cross-sectional passages and walls that form the article 1050. In general, the laser beam 1062 is relatively low power to selectively fuse the individual layer of build material 1070. As an example, the laser beam 1062 may have a power of approximately 50 to 500 Watts, although any suitable power may be provided.

Upon completion of a respective layer, the fabrication support 1014 is lowered and the delivery support 1034 is raised. Typically, the fabrication support 1014, and thus the article 1050, does not move in a horizontal plane during this step. The roller or wiper 1036 again pushes a portion of the build material 1070 from the delivery device 1030 to form an additional layer of build material 1070 on the working plane 1016 of the fabrication device 1010. The laser beam 1062 is movably supported relative to the article 1050 and is again controlled to selectively form another cross-sectional layer. As such, the article 1050 is positioned in a bed of build material 1070 as the successive layers are formed such that the unfused and fused material supports subsequent layers. This process is continued according to the modeled design as successive cross-sectional layers are formed into the completed desired portion, e.g., the coupling apparatus, or component thereof, of step 920.

The delivery of build material 1070 and movement of the article 1050 in the vertical direction are relatively constant and only the movement of the laser beam 1062 is selectively controlled to provide a simpler and more precise implementation. The localized fusing of the build material 1070 enables more precise placement of fused material to reduce or eliminate the occurrence of over-deposition of material and excessive energy or heat, which may otherwise result in cracking or distortion. The unused and unfused build material 1070 may be reused, thereby further reducing scrap.

Any suitable laser and laser parameters may be used, including considerations with respect to power, laser beam spot size, and scanning velocity. As a general matter, the build material 1070 may be formed by any suitable powder, including powdered metals, such as a stainless steel powder, and alloys and super alloy materials, such as nickel-based or cobalt superalloys. In one exemplary embodiment, the build material 1070 is a high temperature nickel base super alloy such as IN718. In other embodiments, MAR-M-247, IN738, titanium, aluminum, titanium-aluminide, or other suitable alloys may be employed. In general, the powder build material 1070 may be selected for enhanced strength, durability, and useful life, particularly at high temperatures, although as described below, the powder build material 1070 may also be selected based on the intended function of the area being formed.

Returning to FIG. 9, at the completion of step 920, the article, i.e., the coupling apparatus, is removed from the additive manufacturing system (e.g., from the DMLF system 1000). In optional step 930, the coupling apparatus formed in step 920 may undergo finishing treatments. Finishing treatments may include, for example, aging, annealing, quenching, peening, polishing, hot isostatic pressing (HIP), or coatings. If necessary, the coupling apparatus may be machined to final specifications. As noted above, one example of a post-laser fusion process of step 930 is a HIP process in which an encapsulation layer is applied and pressure and heat are applied to remove or reduce any porosity and cracks internal to or on the surface of the component. The encapsulation layer functions to effectively convert any surface porosity and cracks into internal porosity and cracks, and after the application of pressure and heat, removes or reduces the porosity and cracks. Such encapsulation layers may be subsequently removed or maintained to function as an oxidation protection layer.

In one exemplary embodiment, the encapsulation layer may be a metal or alloy that is compatible with the substrate and may be applied by a plating or coating process, as described below. In one embodiment, the HIP process may be performed at a processing temperature in a range of about 1000° C. to about 1300° C. and may be performed at a pressure in a range of about 1 ksi to about 25 ksi for a time period of about 1 to about 10 hours. In other embodiments, the HIP processing temperature, pressure, and time may be smaller or larger to form a compacted solid having negligible porosity.

The method 900 has been discussed above with reference to the formation of a single coupling apparatus, or component thereof. However, in one exemplary embodiment of the method 900, more than one coupling apparatus (or component thereof) may be manufactured simultaneously. Unless otherwise noted, method 900 in this embodiment proceeds as discussed above. In this embodiment of the method 900, the articles are formed on a common base block (e.g., base block 1040) to provide a common orientation and a known point of reference and formed as discussed above. Successive layers can be formed for the group of articles simultaneously according to a common module or design. For example, the powdered metal may be deposited across a single working plane and one or more lasers may selectively fuse the layers of each intermediate turbine article, either sequentially or simultaneously. The articles may then be lowered together for the formation of the next layer. Simultaneous fabrication of a number of components may reduce cost and variability of the manufacturing process.

Accordingly, the disclosed coupling apparatus enables relative motion (both axially and radially) between a first fluid flow path and a second fluid flow path, such as a turbine shroud and a turbine nozzle assembly, while providing robust sealing between the turbine nozzle assembly cooling air and the turbine case cooling air. The present disclosure beneficially utilizes DMLS and other additive manufacturing processes to produce a compliant coupling apparatus as one integrated unit.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A coupling apparatus for use in sealingly connecting a first fluid flow path to a second fluid flow path, the coupling apparatus comprising:
   a rigid fluid flow channel having a first end and a second end, wherein the fluid flow channel is substantially rigid in an axial direction and a radial direction;
   a first sealing terminus that is rigidly connected to the first end and that is configured for sealing with the first fluid flow path;
   a second sealing terminus that is slidingly disposed about the second end such that the second sealing terminus is configured for relative movement with respect to the second end, and wherein the second sealing terminus is further configured for sealing with the second fluid flow path, wherein either or both of the first sealing terminus and the second sealing terminus have an external detent configured for the insertion of a flexible sealing member therein; and
   a flexible coupler connected to both the first sealing terminus and the second sealing terminus and surrounding the fluid flow channel, wherein the coupler is relatively more flexible in the axial direction and the radial direction as compared to the fluid flow channel, wherein the coupling apparatus is a unitary structure without any braze or weld joints between any of the fluid flow channel, the first sealing terminus, the second sealing terminus, or the flexible coupler.

2. The coupling apparatus of claim 1, wherein the fluid flow channel is cylindrical in shape and has a circular axial cross-section.

3. The coupling apparatus of claim 1, wherein the fluid flow channel is rectangular in shape and has a square or rectangular axial cross-section.

4. The coupling apparatus of claim 1, wherein the flexible sealing member comprises an O-ring, a C-seal, or a gasket.

5. The coupling apparatus of claim 1, wherein the first sealing terminus and the second sealing terminus are angled with respect to one another for substantially linear fluid flow between the first fluid flow path and the second fluid flow path.

6. The coupling apparatus of claim 1, wherein the first sealing terminus and the second sealing terminus are angled with respect to one another for substantially non-linear fluid flow between the first fluid flow path and the second fluid flow path.

7. The coupling apparatus of claim 1, wherein the flexible coupler comprises a plurality of convolutes along the axial direction.

8. The apparatus of claim 7, wherein at least one of the plurality of convolutes has a wall thickness that is greater than at least one other of the plurality of convolutes.

9. The apparatus of claim 7, wherein the plurality of convolutes are configured with a cotter-pin shape.

10. The apparatus of claim 7, wherein the fluid flow channel is further substantially rigid in a torsional direction, and wherein the flexible coupler is relatively more flexible in the torsional direction as compared to the fluid flow channel.

11. The apparatus of claim 10, wherein the plurality of convolutes are configured with a helical shape.

12. The apparatus of claim 10, wherein at least one convolute of the plurality of convolutes in the axial direction is further convoluted in a circumferential direction about the fluid flow channel.

13. A method for manufacturing a coupling apparatus for use in sealingly connecting a first fluid flow path to a second fluid flow path, the method comprising the steps of:
   providing a three-dimensional design for the coupling apparatus, wherein the three-dimensional design comprises:
      a rigid fluid flow channel having a first end and a second end, wherein the fluid flow channel is substantially rigid in an axial direction and a radial direction;
      a first sealing terminus that is rigidly connected to the first end and that is configured for sealing with the first fluid flow path;
      a second sealing terminus that is slidingly disposed about the second end such that the second sealing terminus is configured for relative movement with respect to the second end, and wherein the second sealing terminus is further configured for sealing with the second fluid flow path, wherein either or both of the first sealing terminus and the second sealing terminus have an external detent configured for the insertion of a flexible sealing member therein; and
      a flexible coupler connected to both the first sealing terminus and the second sealing terminus and surrounding the fluid flow channel, wherein the coupler is relatively more flexible in the axial direction and the radial direction as compared to the fluid flow channel, wherein the coupling apparatus is a unitary structure without any braze or weld joints between any of the fluid flow channel, the first sealing terminus, the second sealing terminus, or the flexible coupler;
   loading the three-dimensional design into an additive manufacturing apparatus, wherein the additive manufacturing apparatus comprises a powder bed and a focused energy beam directed at the powder bed; and
   manufacturing the coupling apparatus using the powder bed and the focused energy beam of the additive manufacturing apparatus in accordance with the three-dimensional design loaded in the additive manufacturing apparatus.

* * * * *